United States Patent [19]

Ashton et al.

[11] 4,160,476
[45] Jul. 10, 1979

[54] SECUREMENT OF HEAT EXCHANGER SURFACES TO TUBES BY LOCK SEAMING AND METHOD OF FABRICATION

[75] Inventors: Larry J. Ashton, Thousand Oaks; Leo Block, Westlake Village, both of Calif.

[73] Assignee: Raypak, Inc., Westlake Village, Calif.

[21] Appl. No.: 768,071

[22] Filed: Feb. 14, 1977

Related U.S. Application Data

[63] Continuation-in-part of Ser. No. 506,226, Sep. 16, 1974, abandoned, and Ser. No. 602,592, Aug. 7, 1975.

[51] Int. Cl.² .................................................. B23P 15/26
[52] U.S. Cl. ........................... 165/171; 29/157.3 C; 29/521; 165/183; 113/118 A; 113/118 C; 113/1 N; 29/157.3 A
[58] Field of Search ............... 165/170, 183, 171, 76; 113/1 C, 118 A, 118 B, 118 C, 118 D, 116 UT, 54 R, 54 A, 58, 118 V, 118 R, 1 N, 57; 29/157.3 C, 157.3 A, 157.3 B, 157.3 D, 521, 524, 728

[56] References Cited

U.S. PATENT DOCUMENTS

| 946,022 | 1/1910 | Earle et al. | 29/728 |
|---|---|---|---|
| 1,015,738 | 1/1912 | Kinnear | 113/118 R |
| 2,012,269 | 11/1932 | Cornell, Jr. | 29/157.3 A |
| 2,731,245 | 1/1956 | McChesney | 29/157.3 A X |
| 2,736,406 | 2/1956 | Johnson | 165/171 X |
| 3,015,293 | 1/1962 | Parham | 113/54 |
| 3,122,115 | 2/1964 | Siegwart | 113/54 |
| 3,407,640 | 10/1968 | Lipp | 113/54 |
| 3,735,465 | 5/1973 | Tibbets et al. | 29/521 |
| 3,838,498 | 10/1974 | Lipp | 113/58 |

FOREIGN PATENT DOCUMENTS

| 503131 | 5/1954 | Canada | 165/171 |
|---|---|---|---|
| 1070874 |  | France | 165/171 |
| 545200 | 7/1922 | France | 165/170 |
| 1012898 | 12/1965 | United Kingdom | 165/171 |

*Primary Examiner*—Francis S. Husar
*Assistant Examiner*—V. K. Rising
*Attorney, Agent, or Firm*—Albert M. Herzig; Edward C. Walsh

[57] ABSTRACT

Securement of flat heat exchange surfaces, particularly fins to tubular conduits of a heat exchanger. The heat exchange material is formed into upper and lower, or first and second pieces having longitudinal, partially circular recesses parallel to the length of a tube for engaging opposite sides of the tube. The radii of the recesses corresponds to the outer diameter of the tube. The recesses extend through less than 180° so that the flat parts of the heat exchange surface are spaced leaving a gap prior to securement to the tubes. The two pieces are initially formed to interengage in such a way that they can be joined by lock seaming on opposite sides of the tube. Forces are applied to the interengaged pieces, forcing them together, stretching the heat exchange material at the recesses, thereby producing a tight interference fit between the heat exchange surfaces and the tube to provide minimum resistance to conduction of heat and at the same time securing the pieces together by lock seaming. The tube remains round and undeformed so the cross-sectional heat exchange area remains the same.

18 Claims, 25 Drawing Figures

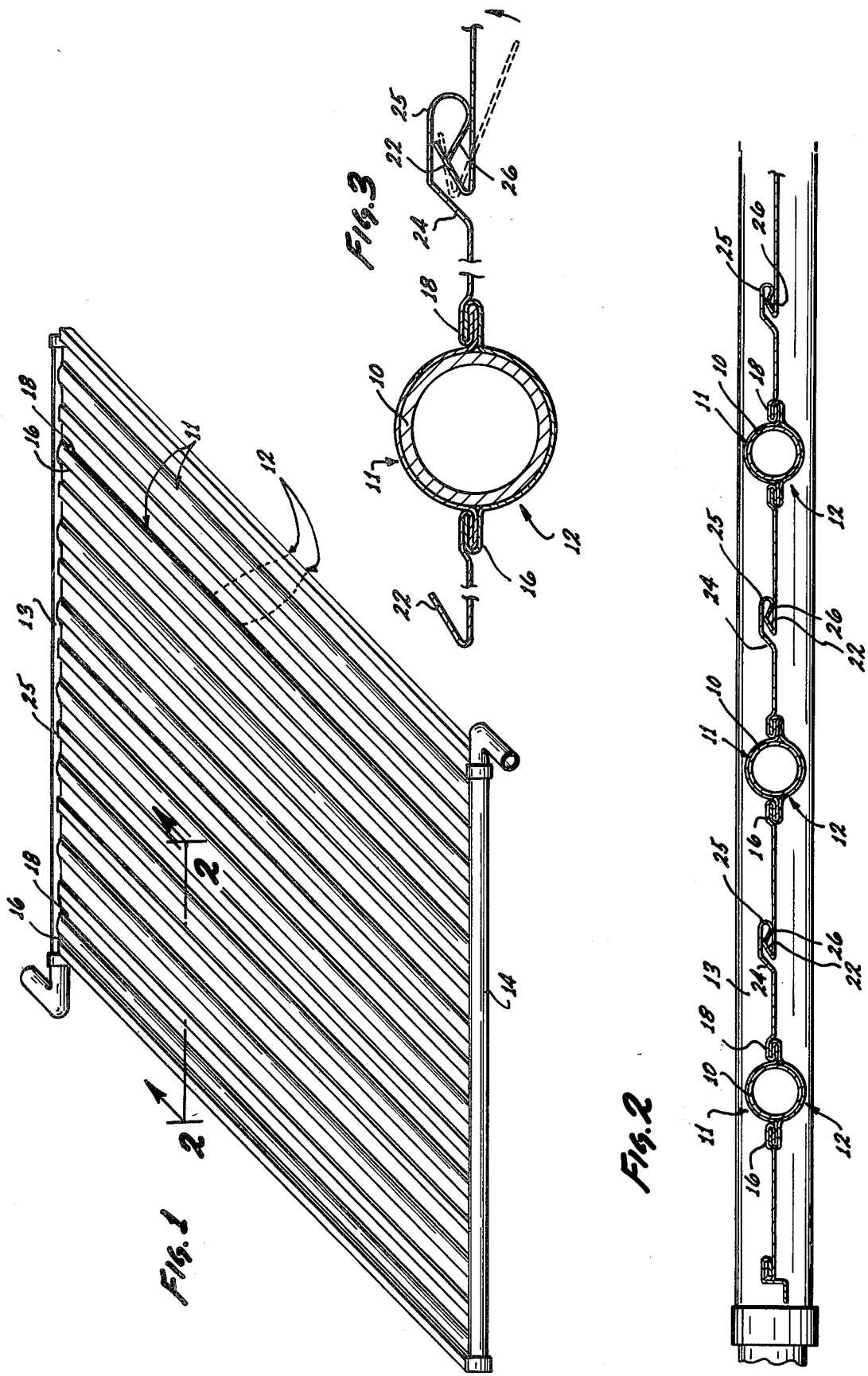

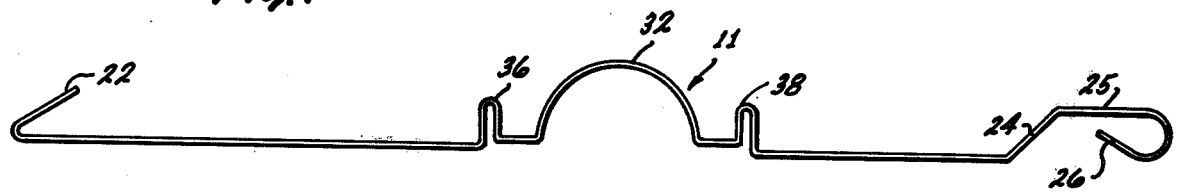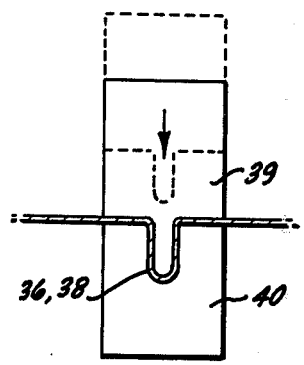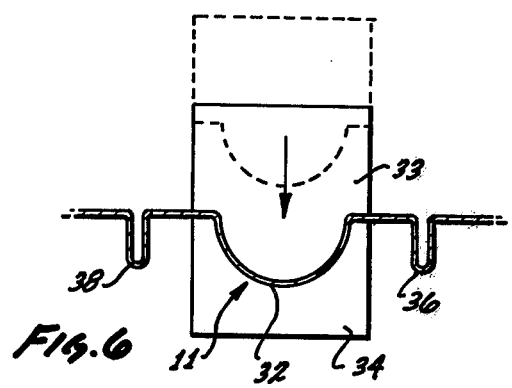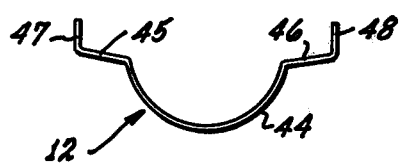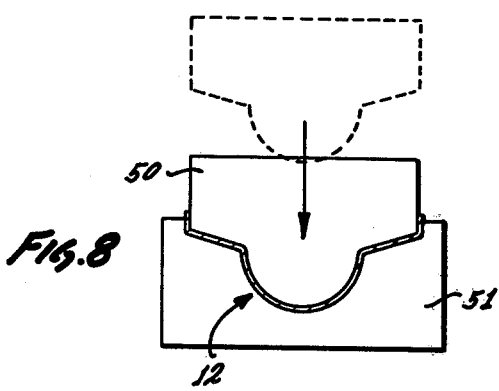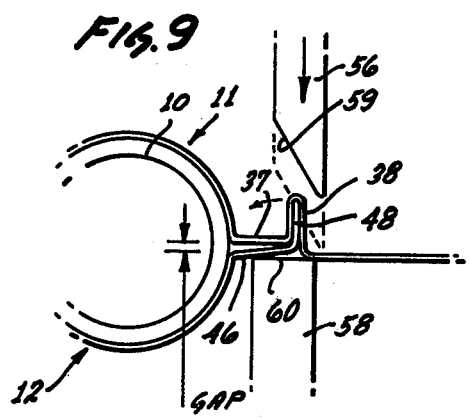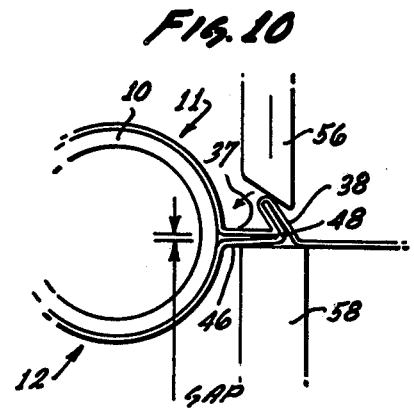

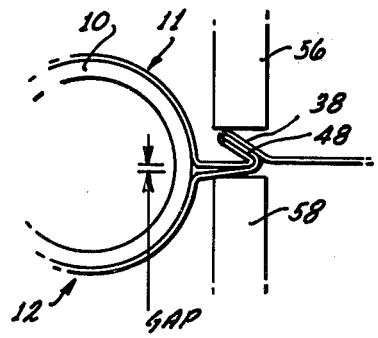
Fig.11
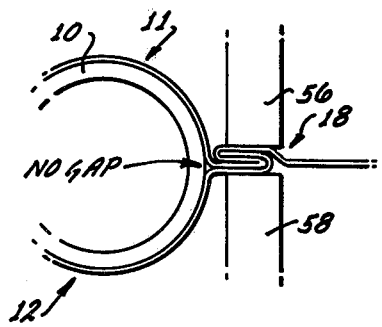
Fig.12
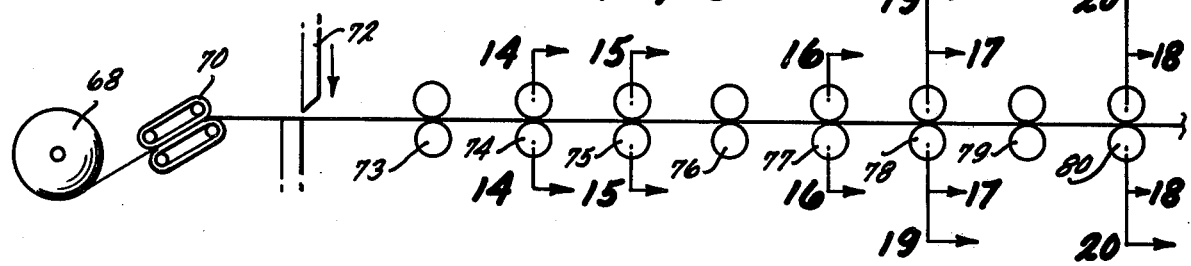
Fig.13
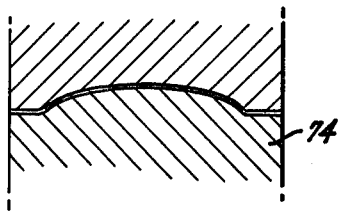
Fig.14
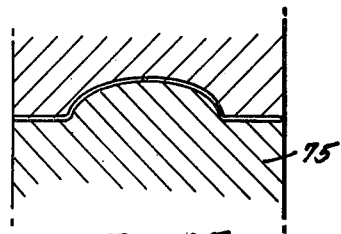
Fig.15
Fig.16
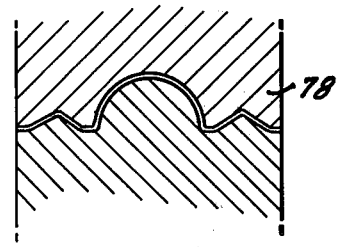
Fig.17
Fig.18

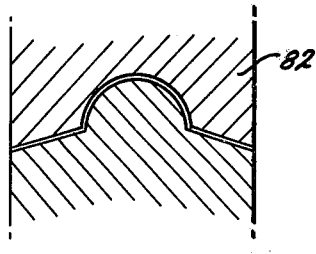
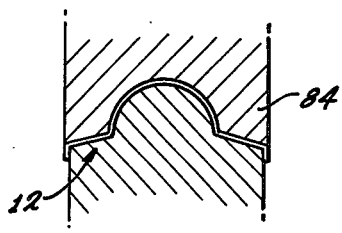
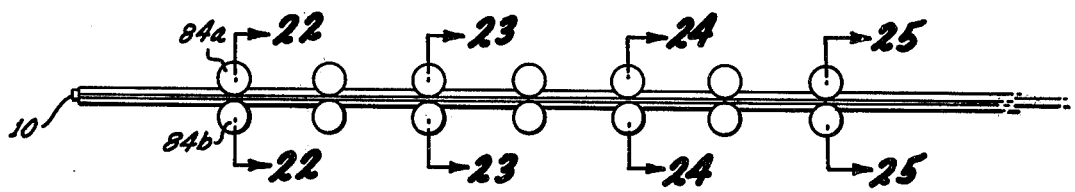
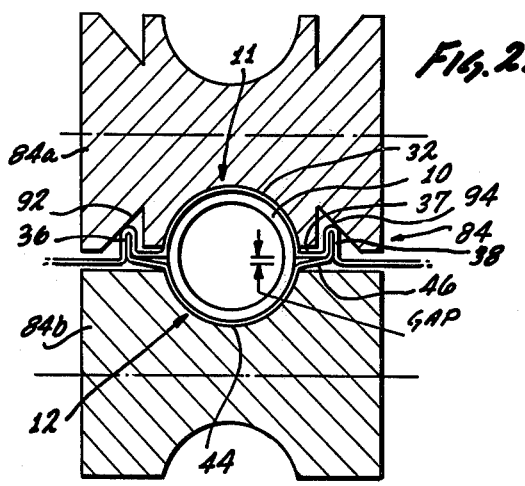
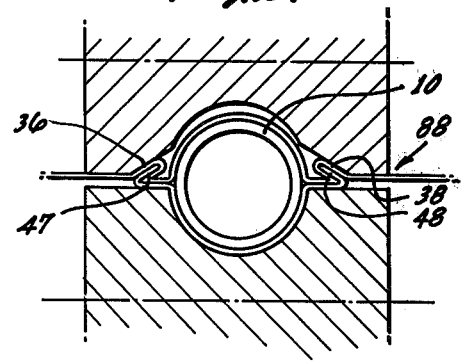
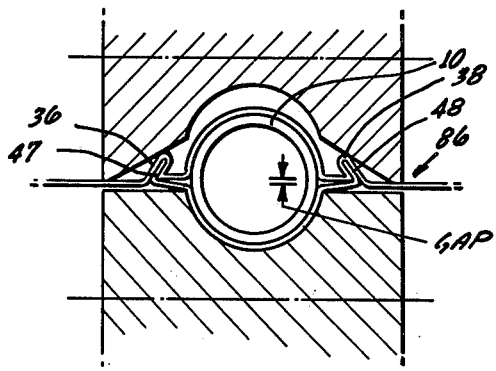
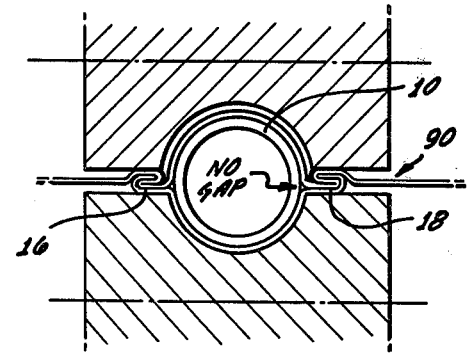

4,160,476

SECUREMENT OF HEAT EXCHANGER SURFACES TO TUBES BY LOCK SEAMING AND METHOD OF FABRICATION

This application is a continuation-in-part of Ser. No. 506,226, now abandoned, filed 9/16/74, and also of Ser. No. 602,592 filed 8/7/75.

BACKGROUND OF THE INVENTION

1. Field of the Invention

The invention resides in the field of heat exchangers, and more particularly, in the field of attachment of securement of heat exchange surfaces, particularly fins to tubular members. The invention is particularly adapted for utilization in solar heat collecting systems.

2. Description of the Prior Art

Heat exchangers comprising finned, tubular members are well known. With respect to the attachment of heat exchange surfaces or fins to tubular members, various types of construction are known. Fins may be fabricated integrally with the tubes. They may be attached by welding or soldering, that is, securing inner edges of the fins to the tubes. The fins may have flanges which are welded to the tubes. The tubes may have flanges which are brazed together forming a heat exchanger. Helical fin material may be wrapped around the tube. A typical construction involves providing holes in fin or heat exchange surfaces, the tubes being inserted through the holes and the tube diameters expanded by manual or hydraulic pressure to engage the peripheral edge of the holes.

Quite often, a thermoconductive paste is used to improve (decrease) the contact resistance. This paste is made of a highly conductive material and tends to fill up all the voids and crevices which would normally be filled with air, which is a poor conductor. However, thermoconductive paste is relatively expensive.

The prior art methods described rely on welding or increasing the diameter of the tube to obtain an interference fit.

The prior art lacks the technology of securement to the tubes by way of lock seaming as described in detail hereinafter.

Prior art U.S. patents are: Nos. 1,982,075; 3,280,530; and 3,379,241.

The herein invention realizes finned tube construction which is entirely unique, as is the method or technique of fabricating as described hereinafter.

SUMMARY OF THE INVENTION

The invention as stated is particularly adapted in heat exchangers for use in solar collector systems. In the preferred form of the invention as described in detail hereinafter, heat exchange members or fins have elongated partially circular recesses formed in them, the radii conforming to the outer diameter of the tube. The recesses extend angularly less than 180°. The fin surfaces adjacent to the tube are clamped together and secured by stretching the fin material without deforming the tube in a manner providing a tight interference fit and minimizing contact resistance to heat transfer. The tube remains round without reduction of heat exchange area. Clamping is by way of lock seaming of the fin material adjacent to the tube so that the need of securement by means of welding, riveting, or otherwise is avoided. The fin material is initially formed, and the lock seaming is accomplished either by way of brake die technique or roll forming.

A primary object of the invention is to provide finned tube construction having maximum transfer capability as between the fin and tube, by means of securing heat exchange material to the tube by a lock seaming technique.

A further object is to realize a method of achieving construction as in the foregoing object wherein a lock seam is provided in a sheet of heat exchange material at an intermediate position of said sheet to provide a path for heat transfer which does not have an edge of said sheet of material included in it.

A further object is to provide a construction wherein the foregoing result is achieved without deforming the tube or reducing its diameter, the fin members on opposite sides of the tube being clamped together, with stretching of the fin material which contacts the tube, with a lock seam formed between the fin members adjacent to the tube.

A further object is to realize the clamping, securing, and stretching of the fin material by way of brake dies or alternatively by roll forming.

Further objects and additional advantages of the invention will become apparent from the following detailed description and annexed drawings.

BRIEF DESCRIPTION OF THE DRAWINGS

FIG. 1 is an isometric view of a heat exchanger constructed in accordance with the invention;

FIG. 2 is a sectional view taken along the line 2—2 of FIG. 1;

FIG. 3 is an enlarged sectional view illustrating the securement of the heat exchange material to a tube and the securement between fins of adjacent tubes;

FIG. 4 is an end view illustrating the shape of the upper or first piece of heat exchange material;

FIGS. 5 and 6 illustrate the brake dies or press brakes utilized in forming the piece of FIG. 4;

FIG. 7 is an end view illustrating the shape of a lower or second piece of material;

FIG. 8 illustrates the brake die or press brake utilized for forming the piece of FIG. 7;

FIGS. 9, 10, 11, and 12 illustrate successive steps in the securement of the upper and lower pieces of heat exchange material by way of lock seaming along the side edge of the tube;

FIG. 13 is a schematic view illustrating the forming of the upper or first piece by means of a roll forming machine;

FIGS. 14–18 are cross-sectional views taken along the respective cross-sectional lines of FIG. 13 illustrating successive stages in the forming of the first or upper piece.

FIGS. 19 and 20 are sectional views corresponding to lines 19—19 and 20—20 of FIG. 13 illustrating successive stages in the forming of the lower or second piece;

FIG. 21 illustrates schematically a roll forming machine adapted for forming the steps of providing the lock seaming along sides of a tube; and FIGS. 22–25 are cross-sectional views taken along the correspondingly numbered lines of FIG. 21 illustrating successive steps in the lock seaming operation.

DESCRIPTION OF THE PREFERRED EMBODIMENTS

The solar collector system consists of several collector plates which would normally be installed on a garage roof or on some other area which is readily exposed to the sun. For example, in a typical swimming pool heater installation, the filter pump takes the suction on the water from the pool, discharges it through a filter, then through the gas-fired swimming pool heater and back into the swimming pool. When a solar collector system is used, a manual or automatic valve is located between the filter and the pool heater. This valve must be closed or at least partially closed. This diverts the water from the filter, through a T fitting and through a group of solar collector panels (arranged in parallel to minimize the pressure drop) and back to the inlet of the heater. The solar collector panels then act as a booster. If sufficient heat is absorbed in the solar collector panels, the heater thermostat senses this increase in temperature and the gas-fired heater does not cycle on.

FIG. 1 is an isometric view of the solar collector panel. Several of these panels are typically used in parallel. The typical pool heater installation will require six to eight of these panels. This collector panel typically consists of several ⅜" OD copper tubes 10 to which aluminum fins 11 and 12 are attached. The finned tubes are connected to parallel headers 13 and 14. The methods of attaching these fins to the copper tubes and the resulting construction are unique.

The aluminum fin strips are painted black and absorb solar radiation and conduct the heat towards the ⅜" diameter tubes 10. Ultimately, the heat flows through the wall of the tubes into the swimming pool water circulated through the tubes. The aluminum strip is a fin attached to the outside of a tube, as will be described. It is desired that resistance to heat flow be minimized and that the heat flow area be maximized.

A key problem in attaching the fin to the tube is to obtain minimum contact resistance to heat flow between the fin and the tube. If the fin is not rigidly attached to the tube, the contact resistance will be high and although the fin itself may be a good conductor of heat, the fin tube will be an inefficient heat transfer device because the heat will have a great deal of difficulty in flowing through the contact area.

The herein solar collector utilizes a longitudinal fin or an extended surface that runs in the same direction as the length of the tube.

The Method Using Brakes Dies

The cross-sectional view of FIG. 2 illustrates how the fins, that is the upper and lower pieces of heat exchange material are secured to the tubes and are secured together for lock seaming.

In FIG. 3 the lock seams are shown at 16 and 18 at opposite sides of the tube 10, the lock seams securing the upper and lower pieces of heat exchange material 11 and 12 together with the material stretched providing an interference fit with the tube itself. The forming of the lock seams 16 and 18 will be described presently.

The upper piece 11 before the lock seams are formed has a shape as illustrated in FIG. 4. The lower piece 12 before the lock seams are formed has a shape as illustrated in FIG. 7. As may be seen in FIGS. 3 and 4, piece 11 is bent at an angle as illustrated by numeral 22 at one end. At the other end there is an upward bend 24, a parallel portion 25 and a reversely bent portion 26. FIG. 3 illustrates how edges of the upper pieces 11 are joined together as shown. One edge of the upper sheet accepts the opposite edge of an adjacent sheet. When one sheet is inserted at an angle into the adjacent sheet, the edge of the metal is readily inserted. When the sheet is rotated to its proper orientation, one edge locks forming an interference fit against the other to form a rigid joint between the two parts. No securement by way of rivets, welding or the like is utilized.

FIG. 4 shows the initial shape of the first or upper piece. The shape can readily be formed by way of a press brake or brake die as illustrated in FIGS. 5 and 6. The upper peice has an intermediate curved recess 32 having a radius corresponding to that of the tube but being of slightly less than 180 degrees extent. This configuration can readily be formed by a brake die as illustraded in FIG. 6, having upper and lower die members 33 and 34, the operation per se being conventional.

On opposite sides of the recess portion 32 are upwardly extending bends or loops 36 and 38 and these configurations can readily be formed by way of a brake die having upper and lower die members 39 and 40 as illustrated in FIG. 5.

FIG. 7 illustrates the initial shape of the second or lower piece of heat exchange material. It has a semi-circular recess 44 having a radius corresponding to that of the tube but being of slightly less than 180 degrees in extent. On opposite sides of the recess are flat portions 45 and 46 with extending flanges 47 and 48 at the ends. This shape or configuration can readily be formed in a brake die as illustrated in FIG. 8, the die having upper and lower die members 50 and 51.

FIGS. 9–12 illustrate successive steps or stages in the process of securing the upper and lower pieces together while providing the interference fit between the heat exchange material and the tube, the operation resulting in lock seams on opposite sides of the tube. The pieces 11 and 12 are fitted together on opposite sides of the tube as illustrated in these figures. The end flanges 47 and 48 on the lower piece 12 fit into the loops 36 and 38 provided in the upper piece. As shown in FIG. 9, this leaves a gap between portion 46 of the lower piece 12 and surface 37 of the upper piece 10.

The securement and the forming of the lock seam is done by way of a brake die. FIGS. 9–12 illustrate schematically a typical brake die having an upper die member 56 and a lower die member 58. The upper die member 56 has a slanted or beveled surface 59, the end surface of the lower die member 58 designated at 60 being flat. FIGS. 9–12 illustrate successive stages as the upper die 56 is brought down towards the lower die 58. The beveled surface 59 engages the loop of material 38 and bends its loop and the flange 48 to the left as shown in the figures until all these portions become horizontal as may be seen in FIG. 12 and in this position the gap between portions 37 and 46 has disappeared, the material now being down against the end surface 60 of die member 58, the material of the circular recesses of both the upper and lower pieces having been stretched to provide the tight interference fit between the heat exchange material and the tube 10.

The same operation is performed on both sides of the tube with the result that the construction is like that shown in cross section in FIG. 3 with the fin material ready for securement between adjacent fin sections as previously described, the edges of the upper pieces forming a joint with an interference fit at three places or positions in the final orientation as seen in FIG. 3.

The Method Utilizing Roll Forming

Roll forming machines as such are widely known in the art and such machines are readily adaptable for the purposes of forming the configurations of the first and second or upper and lower pieces and also for joining the two pieces together on the tube and forming the lock seams along opposite sides of the tube.

FIG. 13 illustrates schematically a roll forming machine adapted for forming the upper and lower fin configurations. In FIG. 13 the fin material may initially be on a roll as designated at 68, the material being one such as aluminum for example, of appropriate gauge.

Numeral 70 designates power driven belts operating over rollers or wheels with the strip or material passing betwen the belts to be driven. A cut off member 72 may be provided. Pairs of tangent rollers are provided as designated at 73, 74, 75, 76, 77, 78, 79, and 80. These rolls or rollers are in the form of roller dies having complementary configurations adapted for bending or forming the material to the desired shape or cross-sectional configuration in successive stages. The respective cross sections of the complementary roller dies 74, 75, 77, 78, and 80 are illustrated in FIGS. 14–18. At each stage an additional degree of bending or forming is imparted to the strip of material as it passes through the machine. As may be seen in FIG. 14 at that stage the curve is being imparted to the strip of material. The curvature is increased through successive stages as may be seen in FIGS. 15–18 until a semi-circular shape 32 is realized. At stage 18 loops 36 and 38 have also been formed. At the stage illustrated in FIG. 17 preliminary upward bending has taken place in the portions of material on opposite sides of the semi-circular formation.

Bends or formations 22 and 24-26 at side edges of the piece 11 can be formed either in the same roller die machine simultaneously or separately in another machine.

The lower piece 12 can be formed or fabricated in the same machine as that illustrated in FIG. 13. Fewer steps or stages are required for the piece 12 since it is of simpler cross section. FIGS. 19 and 20 illustrate roller dies 82 and 84 which may be at the positions illustrated by lines 19—19 and 20—20 of FIG. 13. The process of forming is like that as described in connection with the piece 11.

After the upper and lower pieces have been formed, they can be joined to the tube and the lock seams formed by another roller die machine. Such a machine is illustrated schematically in FIG. 21 showing the tube and the heat exchange material passing between the rollers. The rollers as in the previously described machine have complementary configurations such as to perform the operation of clamping to the tube and forming the lock seaming in successive stages. FIGS. 22-25 illustrate schematically relative die configurations at the corresponding respectively numbered positions illustrated in FIG. 21. The roller dies in FIGS. 22-25 are identified by numerals 84, 86, 88 and 90. As may be seen in FIG. 21, the upper strip 11 is placed over the tube 10 with the strip 12 below it and the tube and the heat exchange material passed through the roller die machine as illustrated. In FIG. 22 the upper die is designated 84a and the lower die 84b. The lower die as may be seen has a circular recess to receive part 44 of the lower member 12. The die 84 has a recess to receive portion 32 of the upper piece 11 and it has openings as designated at 92 and 94 shaped as shown to receive the loops 36 and 38 in the upper piece with the flanges 47 and 48 of the lower piece fitted into the loops as before. At the outset there is a gap between the portions 37 and 46 of the respective pieces as previously described.

FIGS. 23-25 illustrate the respective differences in the upper dies at successive stages of traversal of the machine. As may be seen the upper die serves to bend the loops 92 and 94 with the flanges 37 and 46 inwardly until the material goes into a horizontal position as illustrated in FIG. 25 which is like that of FIG. 12. In this position the gap referred to has disappeared and the material of the circular portions 32 and 44 of the upper and lower pieces has been stretched and brought into an interference fit with the tube. The securement is made without welding or riveting or other comparable type of securement. As in the brake die method the formations at the edges of the upper piece 11 can be formed simultaneously or separately by a further roller die machine.

The roll forming technique permits the use of pre-painted aluminum material and the lock forming operation is performed in a manner that does not damage the painted surface.

The technique is applicable to commercial solar collectors as well as solar pool heaters.

From the foregoing those skilled in the art will understand and appreciate the nature of the invention and the manner in which the objects as set forth in the foregoing are realized. The heat exchange material, that is, the fins are secured to the tubes with an interference fit providing for optimum heat transfer which, of course, has primary significance, particularly in the capture of solar energy. This object is realized while at the same time the securement is achieved by way of lock seaming so that other means such as welding, riveting are not required.

It is significant that the lock seaming is not between two edge portions of material; instead it is between an edge portion of one piece and an intermediate area of a second piece.

The foregoing disclosure is representative of preferred forms of the invention and is to be interpreted in an illustrative rather than a limiting sense, the invention to be accorded the full scope of the claims appended hereto.

What is claimed is:

1. A securement between first and second pieces of material comprising in combination, a lock seam formed between portions of the first and of the second pieces of material, the lock seam being formed by a portion of one piece of material and by an intermediate portion of the second piece of material remote from edges thereof, said pieces of material being formed, adjacent said seam, to extend around a heat exchange tube whereby said second piece of material defines a continuous flow path for heat to said tube.

2. A securement as in claim 1, wherein the lock seam comprises folded over parts of an edge portion of said one piece of material, folded over parts of a portion of the second piece of material lying between the first mentioned parts, said one piece and a third part of the second piece of material lying adjacent to one of said first mentioned parts.

3. A securement as in claim 1, wherein the said lock seam is closely adjacent to the tube, said pieces of the material engaging the tube being in a stretched condition against the tube, providing an interference fit with the tube whereby there is low contact resistance for heat transfer.

4. A securement as in claim 3, there being a similar lock seam on each of opposite sides of the tube, there being sections of said second piece of material extending outwardly from a lock seam forming a heat exchange fin.

5. A securement as in claim 4, including sections of material extending outwardly from lock seams on both sides of the tube forming fins, the outer edges of said sections being configured to be adapted to form a joint between adjacent sections.

6. A method of forming a joint between first and second sections of sheet material including forming a lock seam between an edge portion of a first piece of material and an intermediate portion of the second piece of material, forming the first and second pieces of material on one side of said seam to fit around a heat exchange tube, and securing the material to the tube in heat exchange relationship by forming the lock seam adjacent one side of the tube as a heat exchange surface to provide a continuous path for heat transfer along said second piece and through said seam.

7. A method as in claim 6, including the steps of forming the lock seam by juxtaposing parts of material in overlying relationship, initially providing a gap between certain of said parts adjacent said tube and applying pressure to force said parts together while stretching portions of the material engaging the tube to provide an interference fit, whereby to provide low contact resistance for heat transfer between the material and tube.

8. A method as in claim 6, including preforming a first piece of material to provide a portion conformable to the tube, and to have a lock seam part, preforming a second piece of material to have a portion conformable to the tube and having lock seam parts, interengaging said lock seam parts and then applying bending and clamping forces to the lock seam parts of the first and second pieces to form lock seams on opposite sides of the tube.

9. A method as in claim 8, including the step of preforming the first and second pieces of material by way of a roll forming machine.

10. A method as in claim 9, including the step of securing the first and second pieces to a tube by way of passing the tube and pieces through a roll forming machine forming the lock seams by roll forming.

11. A method of forming a securement between first and second sections of sheet heat exchange material including forming a lock seam between an edge portion of a first piece of material and a portion of the second piece of material, which is remote from the edges of the second piece, the forming including juxtaposing said portions against each other and bending said portions into a position forming the lock seam forming said material on one side of said seam to fit around a heat exchange tube and securing the material to the tube in heat exchange relationship by forming the lock seam adjacent to the tube.

12. A method as in claim 11, including the steps of forming the lock seam by juxtaposing parts of the material in overlying relationship, initially providing a gap between said parts and applying pressure to force said parts together while stretching the material engaging the tube to provide an interference fit.

13. A method as in claim 11 including the step of forming the remainder of the second piece as a heat exchange fin, the said edge being at an extremity of the fin spaced from the lock seam.

14. A method as in claim 11, including the step of bending said portions so as to lie flush against a surface of one of said pieces of material.

15. A method as in claim 11, including preforming the first piece of material to provide a part conformable to the tube, and to have a lock seam portion, preforming the second piece of material to have a part conformable to the tube and to have a lock seam portion and then applying bending and clamping forces to the lock seam portions of the first and second pieces to form a lock seam adjacent to the tube.

16. A method as in claim 15, including the step of forming the first seam portion as a flange and the second seam portion as a fold to receive the flange.

17. A method as in claim 16, including the steps of forming the lock seam by progressively bending the material in stages from the flat condition into the shapes in which the pieces are juxtaposed by passing the pieces between successive forming rolls.

18. A method as in claim 17, including the step of progressively forming the lock seam by passing the juxtaposed pieces between successive forming rolls.

* * * * *